United States Patent [19]

Cisneros

[11] Patent Number: 4,664,712

[45] Date of Patent: May 12, 1987

[54] THERMAL INSULATING MATERIAL AND METHOD OF PRODUCTION THEREOF

[76] Inventor: Ignacio Cisneros, 1112 W. 22nd St., Odessa, Tex. 79763

[21] Appl. No.: 846,750

[22] Filed: Apr. 1, 1986

[51] Int. Cl.⁴ .................................................. C04B 12/04
[52] U.S. Cl. ........................................... 106/84; 106/74; 252/62
[58] Field of Search .................... 106/74, 84; 252/62

[56] References Cited

U.S. PATENT DOCUMENTS

| | | | |
|---|---|---|---|
| 2,534,327 | 12/1950 | Whitman | 106/49 |
| 2,534,328 | 12/1950 | Whitman | 106/49 |
| 3,047,442 | 7/1962 | Bozzacco | 154/2.6 |
| 3,053,694 | 9/1962 | Daunt et al. | 117/95 |
| 3,203,813 | 8/1965 | Gajordo | 106/75 |
| 3,615,755 | 10/1971 | Uto et al. | 106/84 |
| 3,658,564 | 4/1972 | Gerow et al. | 106/84 |
| 4,095,985 | 6/1978 | Brown | 106/77 |
| 4,118,325 | 10/1978 | Becker et al. | 106/75 |
| 4,123,591 | 10/1978 | Karki | 106/84 |
| 4,130,440 | 12/1978 | Nose et al. | 106/74 |
| 4,288,253 | 9/1981 | Venable | 106/84 |
| 4,332,618 | 6/1982 | Ballard | 106/84 |
| 4,336,068 | 6/1982 | Vogel et al. | 106/84 |
| 4,412,863 | 11/1983 | Neely, Jr. | 106/84 |
| 4,446,040 | 5/1984 | Samanta | 106/81 |
| 4,473,404 | 9/1984 | Eckardt et al. | 106/84 |

FOREIGN PATENT DOCUMENTS 808456  2/1981  U.S.S.R. .................. 106/74

Primary Examiner—William R. Dixon, Jr.
Assistant Examiner—Steven Capella
Attorney, Agent, or Firm—Laubscher & Laubscher

[57] ABSTRACT

A novel thermal insulating material is provided which is formed by the curing and drying of a composition comprised of from about 50 to 75 percent by weight of an expanded siliceous inorganic aggregate, from about 25 to 35 percent by weight of an aqueous solution of sodium silicate, from about 5 to about 12 percent by weight of kaolin, from about 3 to about 15 percent by weight of mica, an inorganic reinforcing fiber in an amount of up to about 3 percent by weight, and a filler in an amount of up to about 5 percent by weight. The material possesses desirable insulating properties at both low and high temperatures while also exhibiting highly advantageous structural integrity over a wide range of temperatures.

20 Claims, No Drawings

THERMAL INSULATING MATERIAL AND METHOD OF PRODUCTION THEREOF

BACKGROUND OF THE INVENTION

The present invention relates to thermal insulating materials and a method of production thereof.

Various materials and/or compositions have been either contemplated for or employed in connection with thermal insulation applications. Certain of the most widely employed materials include calcium silicate insulation, fiberglass insulation, mineral wool insulation, polyurethane insulation, foamglass insulation, wall board, ceiling acoustical tiles, etc. However, all of such materials suffer from various deficiencies or disadvantages which render their use less than optimum.

For example, calcium silicate insulation usually contains calcium chloride which becomes corrosive in the presence of moisture. The insulation also retains water for extended periods of time and is not suitable for use in cold environments.

Fiberglass insulation also absorbs water and is unsuitable for use at temperatures in excess of about 1000° F. Fiberglass insulation cannot be employed in cold environments in which moisture is present due to its ability to absorb water.

Mineral wool similarly absorbs water and can accordingly only be used in high temperature environments in the absence of water.

Polyurethane insulation is unsuitable for use at elevated temperatures and is susceptible to burning with the disadvantageous effect of shrinkage and toxic gas evolution.

Foamglass insulation does not have the ability to be employed in environments in which a rapid change of temperature may occur as the material is susceptible to thermal shock.

Acoustical ceiling tile comprised of fiberglass is fragile and absorbs moisture. Polystyrene ceiling tiles are combustible.

Various other types of thermal insulating materials and/or compositions have been suggested in the literature as evidenced by U.S. Pat. Nos. 3,203,813; 3,615,755; 3,658,564; 4,118,325; 4,130,440; 4,288,253; 4,336,068; 4,412,863; 4,446,040; and 4,473,404. However, it is not believed that the materials and/or compositions described in such patents exhibit the moisture resistance, ease of manufacture and shaping, effectiveness over a wide range of temperature conditions (i.e., effective both at low and high temperatures), thermal shock resistance, corrosion resistance and resistance to shrinkage to the extent that is desirable in such materials.

OBJECTS AND SUMMARY OF THE INVENTION

It is accordingly an object of the present invention to provide a thermal insulating material which exhibits desirable moisture resistance.

It is accordingly also an object of the present invention to provide a thermal insulating material which is effective at both low and high temperatures.

It is also an object of the present invention to provide a thermal insulating material which is resistant to thermal shock.

It is also an object of the present invention to provide a thermal insulating material which is corrosion resistant.

It is also an object of the present invention to provide a thermal insulating material which is resistant to shrinkage.

It is also an object of the present invention to provide a method for the production of insulating materials which possess the above characteristics.

In accordance with one aspect of the present invention, there is provided a shaped article possessing desirable thermal insulating properties produced by a method comprising the steps of:

(a) forming an admixture comprised of an expanded siliceous inorganic aggregate in an amount ranging from about 50 to 75 percent by weight, an aqueous solution of sodium silicate in an amount ranging from about 25 to about 35 percent by weight having a solids content of from about 36 to 44 percent, kaolin in an amount ranging from about 5 to 12 percent by weight, mica in an amount ranging from about 3 to 15 percent by weight, an organic reinforcing fiber in an amount of up to about 3 percent by weight, and a filler in an amout of up to about 5 percent by weight;

(b) shaping said admixture under pressure to form a shaped article; and (c) curing and drying said shaped article at a temperature ranging from about 240° to about 260° F.

In accordance with another aspect of the present invention, there is provided a novel thermal insulating material produced by the above method.

DETAILED DESCRIPTION OF THE INVENTION

To briefly summarize the present invention, the thermal insulating material of the present invention exhibits highly desirable physical characteristics which result in the advantageous use thereof as a thermal insulating material. The material may be formed into a shaped article having the desired thermal insulative properties by the formation of an admixture of the respective components, shaping the admixture under pressure to form a shaped article, followed by the curing and drying of the shaped article.

Various types of expanded siliceous inorganic aggregates may be employed in the present invention including but not being limited to expanded perlite, expanded clay, cellular glass, expanded slag, expanded vermiculite as well as mixtures thereof. The expanded siliceous inorganic aggregate is generally employed in an amount ranging from about 50 to 75 percent by weight based on the weight of the composition, with the aggregate enhancing the insulative properties of the composition due to its use in an expanded form. The preferred expanded siliceous inorganic aggregate for use in the present invention is expanded perlite.

The siliceous inorganic aggregate may be provided initially in an expanded form or the siliceous aggregate in the form of an ore may be caused to expand by heat treatment at suitably elevated temperatures, such as, for example, from about 1600 to 1640° F. Perlite ore may be heated to about 1640° F. to cause the necessary expansion of same. Methods of preparation of expanded perlite are well known and are, for example, disclosed in U.S. Pat. Nos. 2,455,666; 2,501,699; and 2,621,160, herein incorporated by reference.

The expanded siliceous inorganic aggregate preferably possesses a density in the range of from about 2 to 8 lbs/ft$^3$, with the density of the expanded siliceous inorganic aggregate more preferably ranging from about 8 to 15 lbs/ft$^3$. The aggregate is generally employed in a particle size of from about 150 to about 250 mesh (grade 50C to 66).

The composition of the present invention further includes kaolin in an amount of from about 5 to 12 percent by weight, and preferably from about 5 to about 8 percent by weight. The kaolin assists in enhancing the moisture and shrinkage resistance of shaped articles comprised of the composition.

An important further aspect of the present invention comprises the inclusion of an organic reinforcing fiber in an amount of up to about 3 percent by weight. A minimum of about 2 percent by weight of the reinforcing fiber is generally employed in the composition, based on the weight of the composition. A variety of organic reinforcing fibers may be employed in the present invention. For example, organic reinforcing fibers selected from the group consisting of nylon fibers, polyester fibers, rayon fibers and mixtures thereof are suitable for use. The fibers employed are preferably stable at elevated temperatures at least up to about 250° F. The above listing of organic fibers is not intended to be all-inclusive but may be expanded based on the knowledge of those skilled in the art. Such fibers are preferably employed in a size of from about ¼ to about ½ inch.

Various types of fillers may also be incorporated in the composition of the present invention. For example, calcium carbonate or metallic oxides such as iron oxide may be employed. Such fillers are generally employed in amounts ranging up to about 5 percent by weight based on the weight of the composition, and are preferably present in an amount of from about 2 to about 3 percent by weight.

Two of the most important components of the present invention comprise mica and sodium silicate. The mica is present in an amount of from about 3 to 15 percent by weight based on the weight of the composition, with the sodium silicate being employed in the form of an aqueous solution in an amount of from about 25 to about 35 percent by weight based on the weight of the composition, with the aqueous solution of sodium silicate having a solids content of from about 36 to 44 percent, and preferably about 40 percent.

The combination of the sodium silicate and mica has been unexpectedly and surprisingly found to result in the production of a thermal insulative composition which possesses desirably high density as well as fire resistance. Additionally, the sodium silicate serves as a bonding agent to bind each of the noted components together and serving as a structural matrix for the composition. Upon curing, the sodium silicate provides moisture resistance.

The combination of mica and an alkali metal silicate (e.g., sodium silicate) in a thermal barrier coating is disclosed in U.S. Pat. No. 4,332,618 (issued to Ballard). However, the Ballard patent does not disclose a thermal insulating material as presently described suitable for use in the production of shaped articles in which mica is but one of various components which are employed.

The sodium silicate is initially employed in the form of an aqueous solution thereof having a solids content of from about 36 to about 44 percent by weight, based on the weight of the solution. The weight ratio of $SiO_2$ to $Na_2O$ in the sodium silicate ranges from about 3:1 to 4:1. Preferably, grade 40 sodium silicate is employed as the binder in the composition of the present invention.

The mica constituent of the composition of the present invention is employed in particulate form, with the size of the mica particles being within the range of from about 300 to about 325 mesh in dimension.

A silicone liquid may also be employed in the composition of the present invention to enhance the moisture resistance thereof. The silicone liquid is employed in an amount ranging from about 0.3 to about 0.5 percent by weight based on the total weight of the composition. Suitable silicone liquids are well-known to those skilled in the art and may be employed in emulsion form.

The thermal insulative materials of the present invention can be prepared in the following manner. Kaolin ore, the aqueous solution of sodium silicate, a filler (e.g., calcium carbonate and/or iron oxide ore), an organic reinforcing fiber (e.g., nylon fibers), and a silicone waterproofing composition may combined to form an admixture to which the expanded inorganic siliceous aggregate (e.g., expanded perlite) is added. The admixture is then blended to provide a composition which may be extruded or molded under pressure to yield a shaped article of the dimensions desired. The composition may be extruded or molded at a pressure ranging from about 25 to about 150 psi. For example, the composition may be molded at a pressure of about 75 psi for a time period of about 30 seconds. Pressures in excess of those noted should be avoided in order to avoid undue compaction of the shaped article.

Once the molding step is completed, the molded shaped article is dried and cured at a temperature in the range of from about 240° to 260° F., and preferably about 240° F., for a time of from about 60 to about 120 minutes. Once dried and cured, the shaped article may be removed from the mold and further shaped, if necessary, etc. prior to use. The shaped article may be cured (e.g., while in the mold) by means of contact with hot air or by contact with heated carbon dioxide gas in manner known to those skilled in the art.

The advantages of the present invention are well illustrated by the following comparison based on low and high temperature tests. A 3 inch I.P.S. pipe 12 feet in length was provided and insulated on the exterior with separate 4 foot long sections of insulation material of a 2 inch thickness, with the separate sections of insulation material comprising foamglass insulation, polyurethane insulation and an insulation material prepared in accordance with the present invention.

Three thermocouples were installed inside the steel pipe, with three thermocouples also being installed over the exterior of the insulation. The thermocouples were positioned in pairs (interior and exterior) along the respective portions of the three sections of insulation.

Refrigerant was subsequently passed through the interior of the pipe at a temperature of $-100°$ F. for 4 hours, with temperature determinations being made every 15 minutes. During the 4 hour test period, the temperature measured along the outside of the pipe only changed about 3 to 5 degrees F. It was thus apparent that the three materials each provided acceptable low temperature insulative characteristics.

Once the low temperature test was completed, a burner was installed within the pipe to heat the interior of the pipe to 750° F. Within seconds, the foamglass insulation began to crack and fall from the pipe. The polyurethane insulation began to burn and shrink. By way of dramatic contrast, the insulation material prepared according to the present invention showed no ill effects and did not exhibit any structural instability such as shrinkage. It is thus clear that the thermal insulation material prepared according to the present invention not only exhibits satisfactory properties at both low and high temperatures but also exhibits highly desirable thermal stability over a wide temperature range.

Shaped bodies comprised of the composition of the present invention exhibit a multitude of desirable physical properties. The shaped bodies may be in the form of various sizes and shapes, and may be employed in the form of building wall boards, pipe insulation, acoustical ceiling tiles, and as a filler for wood doors. It can withstand temperatures over the range of from about −250° F. to about 1500° F. The shaped bodies can exhibit a density of from 4 to 16 lbs/ft$^3$ and can be press molded or extruded at pressures of from 25 to 100 psi. The shaped body is moisture resistant, adsorption resistant and resistant to the effects of hydrochloric and sulfuric acid. The shaped body is also shrinkage resistant under both low and high temperatures and exhibits a thermal conductivity at 300° F. of about 0.47 BTU/hr/ft$^2$/°F-/in.

The invention is additional illustrated in connection with the following Example which is to be considered as illustrative of the present invention. It should be understood, however, that the invention is not limited to the specific details of the Example.

EXAMPLE

A shaped article comprised of the composition of the present invention was prepared by initially admixing an aqueous solution of sodium silicate (Diamond Shamrock, grade 40) and kaolin (Texas Mining, 325 mesh). Mica mineral flour (Texas Mining, 325 mesh), dry calcium carbonate (Texas Mining, 250-300 mesh), iron oxide and nylon fibers (¼-½ inch) were subsequently added to the mixture and thoroughly combined therewith. Liquid silicone (General Electric, grade SM-2138) was later added. Expanded perlite ore (Grefco Co., 200 mesh) was subsequently provided and the above mixture added to the perlite ore. The blended mixture was subsequently pressed at a suitable pressure within the range of from 25 to 100 psi to yield a shaped article having thermal insulative properties, with the blended mixture composition comprised of the following:

| | |
|---|---|
| Expanded perlite | 52.3 wt % |
| Sodium silicate solution | 26.3 |
| Kaolin | 10.2 |
| Mica | 4.4 |
| Chopped nylon fibers | 1.2 |
| Calcium Carbonate | 4.2 |
| Iron oxide | 0.6 |
| Silicone | 0.3 |
| | 100.00 wt % |

It is to be understood that the foregoing embodiments are only illustrative of the principles of the invention, and that various modifications can be made by those skilled in the art without departing from the scope and spirit of the invention.

I claim:
1. A method for the production of a shaped article possessing thermal insulation properties comprising the steps of:
   (a) forming an admixture comprised of an expanded siliceous inorganic aggregate in an amount ranging from about 50 to 75 percent by weight, an aqueous solution of sodium silicate in an amount ranging from about 25 to about 35 percent by weight having a solids content of from about 38 to 44 percent, kaolin in an amount ranging from about 5 to 12 percent by weight, mica in an amount ranging from about 3 to 15 percent by weight, an organic reinforcing fiber in an amount of up to about 3 percent by weight, and a filler in an amount of up to about 5 percent by weight;
   (b) shaping said admixture under pressure to form a shaped article; and
   (c) curing and drying said shaped article at an elevated temperature.

2. The method of claim 1 wherein said expanded siliceous inorganic aggregate is selected from the group consisting of expanded perlite, expanded clay, cellular glass, expanded slag, expanded vermiculite and mixtures thereof.

3. The method of claim 2 wherein said expanded siliceous inorganic aggregate is expanded perlite.

4. The method of claim 1 wherein said organic reinforcing fiber is selected from the group consisting of nylon fibers, polyester fibers, rayon fibers and mixtures thereof.

5. The method of claim 1 further comprising a silicone liquid.

6. The method of claim 1 wherein said silicone liquid is present in an amount of up to about 0.5 percent by weight.

7. The method of claim 1 wherein said filler is selected from the group consisting of calcium carbonate, iron oxide and mixtures thereof.

8. The method of claim 7 wherein said filler comprises calcium carbonate.

9. The method of claim 7 wherein said filler comprises iron oxide.

10. The method of claim 1 wherein said aqueous solution of sodium silicate has a solids content of about 40 percent.

11. The method of claim 1 wherein said elevated temperature ranges from about 240° to 260° F.

12. A shaped article possessing thermal insulation properties produced by a process comprising the steps of:
   (a) forming an admixture comprised of an expanded siliceous inorganic aggregate in an amount ranging from about 50 to 75 percent by weight, an aqueous solution of sodium silicate in an amount ranging from about 25 to about 35 percent by weight having a solids content of from about 38 to 44 percent, kaolin in an amount ranging from about 5 to 12 percent by weight, mica in an amount ranging from about 3 to 15 percent by weight, an organic reinforcing fiber in an amount of up to about 3 percent by weight, and a filler in an amount of up to about 5 percent by weight;
   (b) shaping said admixture under pressure to form a shaped article; and
   (c) curing and drying said shaped article at an elevated temperature.

13. The article of claim 12 wherein said expanded siliceous inorganic aggregate is selected from the group consisting of expanded perlite, expanded clay, cellular glass, expanded slag, expanded vermiculite and mixtures thereof.

14. The article of claim 13 wherein said expanded siliceous inorganic aggregate is expanded perlite.

15. The article of claim 12 wherein said inorganic reinforcing fiber is selected from the group consisting of nylon fibers, polyester fibers, rayon fibers and mixtures thereof.

16. The article of claim 12 wherein said admixture further comprises a silicone liquid.

17. The article of claim 16 wherein said silicone liquid is present in said admixture in an amount of up to about 0.5 percent by weight.

18. The article of claim 12 wherein said filler is selected from the group consisting of calcium carbonate, iron oxide and mixtures thereof.

19. The article of claim 12 wherein the solids content of the aqueous solution of sodium silicate is about 40 percent.

20. The article of claim 12 wherein said elevated temperature ranges from about 240° to 260° F.

* * * * *